United States Patent
Knox et al.

[11] 3,768,564
[45] Oct. 30, 1973

[54] METHOD OF FRACTURE ACIDIZING A WELL FORMATION

[75] Inventors: John A. Knox; Sherman E. Fredrickson, both of Duncan, Okla.

[73] Assignee: Halliburton Company, Duncan, Okla.

[22] Filed: Apr. 26, 1971

[21] Appl. No.: 137,625

[52] U.S. Cl. .................................. 166/307, 166/308
[51] Int. Cl. ............................................... E21b 43/27
[58] Field of Search .................... 166/307, 308, 281, 166/283, 280

[56] References Cited
UNITED STATES PATENTS

| | | | |
|---|---|---|---|
| 3,481,401 | 12/1969 | Graham | 166/307 X |
| 2,689,009 | 9/1954 | Brainerd, Jr. et al. | 166/307 X |
| 2,802,531 | 8/1957 | Cardwell et al. | 166/307 X |
| 2,975,834 | 3/1961 | West et al. | 166/307 X |
| R23,733 | 11/1953 | Farris | 166/308 UX |
| 3,233,672 | 2/1966 | Carpenter | 166/307 |
| 3,343,602 | 9/1967 | Knox et al. | 166/307 |
| 3,075,581 | 1/1963 | Kern | 166/280 |
| 3,455,388 | 7/1969 | Huitt | 166/308 X |
| 3,642,068 | 2/1972 | Fitch et al. | 166/308 X |
| 2,681,889 | 6/1954 | Menaul et al. | 166/307 |

*Primary Examiner*—Stephen J. Novosad
*Attorney*—Thomas R. Weaver, John H. Tregoning and Michael J. Caddell

[57] ABSTRACT

The present invention relates to an improved method of fracture acidizing underground well formations so that the production of oil and gas therefrom is increased. By the method of the present invention high capacity flow channels are created and sustained in the formation, particularly in the area thereof adjacent to the well bore.

12 Claims, No Drawings

METHOD OF FRACTURE ACIDIZING A WELL FORMATION

The present invention relates to an improved method of fracture acidizing wells, and more particularly, but not by way of limitation, to an improved method of fracture acidizing underground well formations whereby high capacity flow channels are etched therein to increase the production of oil, gas and the like therefrom.

Many various methods have been developed and used successfully for increasing or stimulating the production of oil, gas and the like from well formations. One commonly used method of well stimulation where the producing formation is formed of rock of relatively low permeability is known in the art as fracture acidizing. Fracture acidizing consists of pressure parting a well formation, extending the created fracture and then etching the fracture faces with acid so that when the formation is returned to production, flow channels remain therein through which desired fluids contained in the formation flow to the well bore.

In fracture acidizing procedures used heretofore, less than desired results have often been achieved. That is, high capacity flow channels are often not created in the formation due to the destruction or restriction of the channels etched in the fracture faces when the fractures are allowed to close. Heretofore, the fracture acidizing treatment of a well formation has been carried out by first creating fractures in the formation and then injecting acid into the fractures at high rates and pressures so that the fractures are held open during the acid injection. While the acid readily attacks and etches channels in the rock faces of the fractures, when the pressure on the formation is reduced and the fractures allowed to close, the channels formed are restricted or destroyed, particularly the channels etched in the fracture faces adjacent to the well bore which are exposed to the etching action of the acid for a relatively long period of time. The longer the acid is allowed to etch the rock faces adjacent to the well bore, the less formation oil and gas flow capacity may result due to the entirety of the rock faces being exposed to the acid thereby becoming softened or over-etched so that upon closing, the faces crush against each other.

By the present invention, an improved method of fracture acidizing a well formation is provided whereby high capacity flow channels are created in the formation which are not restricted or destroyed upon completion of the fracture acidizing treatment.

The present invention relates to a method of fracture acidizing a well formation so that high capacity flow channels are formed therein which comprises the steps of inducing fractures in the formation, contacting the faces of the fractures with acid while maintaining the fractures in an open position so that channels are etched therein, allowing the fractures to close, and then flowing acid through the channels while the fractures are closed so that the channels are enlarged thereby forming high capacity flow channels in the formation.

The present invention is based on the discovery that if a fracture in a well formation is allowed to close prior to prolonged contact with acid and then additional acid is flowed between the closed faces of the fracture, high capacity flow channels are formed in the formation through which increased rates of oil and gas may be produced. By the present invention the faces of the fracture are prevented from being over-etched or softened by the acid so that portions of the fracture faces are left intact for providing support when normal closure pressure is applied to the fracture.

A preferred technique for carrying out the improved method of the present invention is to first fracture the well formation and extend the fractures outwardly from the well bore using conventional fracturing fluids. That is, a conventional fracturing fluid is pumped into the formation through the well bore at a high rate and pressure causing the formation to fracture. The fractures formed are extended as much as possible by continued pumping of the fracturing fluid into the formation. After the formation has been fractured and the fractures extended, a quantity of acid is pumped into the formation at a pressure equal to or greater than the pressure at which fracturing of the formation occurred. The high pressure maintained on the formation during the injection of the acid causes the fractures to be held open, i.e., the fracture faces to be held apart, as the acid is flowed through the fractures. During this step the acid attacks the rock faces of the fractures causing channels to be etched therein, but the etching action is controlled so that over-etching or softening of the entire fracture faces does not occur. The pumping is then stopped and the pressure on the formation is lowered below the pressure at which the formation was initially fractured. The lowering of the pressure on the formation causes the fracture or fractures to close. Additional acid is then pumped into the formation through the well bore at a pressure below the pressure at which the fracturing of the formation occurred, but sufficient to cause the acid to flow through the channels formed in the faces of the fracture or fractures. As the additional acid flows through the previously formed channels, the channels are enlarged and high capacity flow channels are formed in the closed fractures. As will be apparent, the additional acid flowed through the closed fractures does not contact portions of the fracture faces thereby leaving these portions intact for providing support and preventing the fracture faces from crushing together and destroying the flow channels. Preferably, the additional acid is caused to flow through the closed fracture for an initial period of time at a relatively low rate so that high capacity flow channels are formed adjacent to the well bore. After a period of time sufficient for the etching of the high capacity flow channels adjacent to the well bore, the acid injection rate is increased to force acid into the formation relatively long distances outwardly from the well bore thereby extending and creating additional flow channels. Further, after the fractures have been initially etched and allowed to close, unretarded acid is preferably flowed through the closed fractures at the relatively low injection rate followed by retarded acid at the relatively high injection rate. The unretarded acid readily forms the high capacity flow channels adjacent to the well bore, and the subsequent injection of retarded acid brings about the formation of the additional flow channels relatively long distances from the well bore.

The acid initially injected into the fractures while they are being held open may be retarded or unretarded depending on the particular formation being treated and other factors. However, the etching action of the acid on the rock faces is controlled either by limiting the quantity of acid injected or the time the acid is allowed to remain in the fractures so that channels are etched therein, but the fracture faces are not over-etched or softened over the entire surface areas thereof, thereby insuring that portions remain intact for providing support when the fractures are closed.

An alternate preferred technique which may be employed for carrying out the improved method of the present invention is to utilize acid for fracturing the formation as well as for initially creating channels in the fracture faces. In this technique, either retarded or unretarded acid is pumped into the formation through the well bore at a rate and pressure sufficient to cause the formation to fracture. The injection of the acid is continued at or above the fracturing pressure so that the fractures formed are held open, extended outwardly from the well bore, and channels are etched in the fracture faces by the acid. Once the fractures have been extended and preliminarily etched by the acid to form channels in the fracture faces, the pressure exerted on the formation is lowered so that fractures are closed, and additional acid is pumped through the closed fractures in the same manner as described above to cause the channels to be enlarged and high capacity flow channels formed therefrom.

An alternate technique which may be employed for carrying out the method of the present invention is to create fractures in the formation in a conventional manner and place conventional propping agent in the fractures formed. Conventional propping agents may be sand, glass beads, metal shot, plastic particles, and other well known in the art. After the fractures have been formed, extended and propping agent placed therein, the pressure on the formation is reduced allowing the fractures to close on the propping agent. Acid is then pumped into the formation at a rate and pressure below the pressure required to open the fractures, but sufficient to cause acid to flow through the propped fracture. The acid will etch high capacity flow channels along portions of the fracture without appreciably disturbing the propping agent. High rates of unretarded or retarded acid may then be pumped into the formation to extend the flow channels relatively long distances outwardly from the well bore.

As will be understood, any of a variety of organic or inorganic acids may be utilized for carrying out the method of the present invention, which acids are capable of etching the particular formation to be treated. Preferred acids for treating calcareous formations are aqueous solutions of hydrochloric acid, acetic acid, formic acid, hydrofluoric acid, and mixtures thereof. As mentioned, the acids utilized may be retarded for slowing the reaction rate of the acid on the formation with conventional acid retarding agents, or unretarded acids may be used. Additionally, the acids may contain conventional corrosion inhibitors to protect metal surfaces contacted thereby.

Any of a variety of conventional fracturing fluids may be employed in accordance with the present invention for initially creating fractures in the formation. Examples of suitable fracturing fluids are water, gelled water, hydrocarbon-in-water emulsions, water-in-hydrocarbon emulsions, gelled hydrocarbons and high viscosity hydrocarbon liquids.

In order to present a clear understanding of the present invention, the following examples are given to illustrate typical well treating procedures utilizing the methods of the present invention. As will be understood, prior to treating a particular formation, conventional laboratory tests and calculations are made to determine the optimum treating fluid properties, quantities, rates of injection, etc. The quantities and types of the various treating fluids given in the examples are for illustration purposes only and the present invention is not to be limited thereto.

EXAMPLE I

The well bore and formation are initially treated with 500 gallons of mud cleanout agent, such as a solution of 7.5 percent by weight hydrochloric acid and 3 percent by weight conventional surface active agent.

10,000 gallons of gelled water are pumped into the formation to prevent excessive fluid loss therein.

Five barrels of oil are next pumped into the formation. This step is carried out to provide initial retardation of acid reaction with the formation.

20,000 gallons of conventional fracturing fluid are pumped into the formation at a rate of approximately 20 barrels per minute and at a pressure sufficient to fracture the formation.

20,000 gallons of a 15 percent aqueous hydrochloric acid solution are pumped into the formation at a pressure equal to or greater than the formation fracture pressure and a rate of approximately 20 barrels per minute to extend the fractures formed outwardly from the well bore and to etch channels in the fracture faces.

The injection pumps are stopped and the pressure allowed to drop so that the fractures formed in the formation close.

When the formation has relaxed and the fractures closed, a 15 percent aqueous solution of hydrochloric acid is pumped into the formation at a rate of one-half to 1 barrel per minute and at a pressure below the fracturing pressure. The acid is pumped for at least 30 minutes at this low injection rate to establish high fracture flow capacity channels in the immediate vicinity of the well bore.

The well is returned to production.

EXAMPLE II

An aqeuous solution of 15 percent hydrochloric acid containing convention acid retarding agent and fluid loss additives is pumped into the formation at a rate and pressure sufficient to create and extend fractures therein. After the fractures have been created, pumping of the acid is continued at a pressure equal to or greater than the fracturing pressure for a period of time sufficient to cause initial etching of the fracture faces.

The pumps are stopped and the pressure exerted on the formation lowered so that the fractures formed are closed. An unretarded aqueous solution of 15 percent hydrochloric acid is pumped into the formation at a rate of approximately one-half barrel per minute and a pressure below the fracturing pressure.

At predetermined intervals the acid solution injection rate is increased at one-half barrel per minute increments. The pressure or laboratory determined reaction times are used as a guide to the rate increases. The injection rate is increased until the desired rate for extension of the fractures is reached at which time retarded acid is pumped into the formation.

A retarded 15 percent acid solution is pumped into the formation through highly conductive flow channels formed adjacent to the well bore to form additional flow channels throughout the formation, and the treatment is completed in a conventional manner.

Laboratory tests illustrating the improved results achieved by the method of the present invention are as follows:

PROCEDURE

Core samples tested are formed from Bedford limestone and are prepared by cutting the cores into discs approximately 1 inch thick by 3½ inches in diameter. The test discs are then mounted in lead with one surface approximately one-fourth inch above the lead. For each test two core discs are placed in an acid etch fracture flow capacity device wherein the core surfaces are positioned facing each other to simulate the faces of a formation fracture. The core faces are positioned at a predetermined distance from each other and regular 15 percent hydrochloric acid is pumped between the core faces at a pressure of 1,000 psig and a temperature of 75° F. For each core sample tested, the acid is flowed across one set of discs in the simulated open fracture position, and three additional sets of discs are tested with the acid contacting the discs in the simulated open fracture position for an initial period of time and then contacting the discs in the simulated closed fracture position for the remainder of the test time.

TABLE I

EFFECT OF ACID ETCHING SIMULATED FRACTURE FACES ON RESULTANT CLOSED FRACTURE FLOW CAPACITY

| Core | Core Disc Spacing (in) | Acid Flow (ml/min) | Time Acid Flowed Across Core Disc Faces (min.) | Resulting Flow Capacity of Simulated Closed Fracture (md.ft.) |
|---|---|---|---|---|
| 1 | 0.05 | 16.7 | 20 | 30,716 |
|   | 0.05 | 16.7 | 15 | —* |
|   | Closed | 16.7 | 5 | 43,665 |
|   | 0.05 | 16.7 | 10 | —* |
|   | Closed | 16.7 | 10 | 41,256 |
|   | 0.05 | 16.7 | 5 | —* |
|   | Closed | 16.7 | 15 | 51,193 |
| 2 | 0.05 | 16.7 | 30 | 3,129 |
|   | 0.05 | 16.7 | 20 | —* |
|   | Closed | 16.7 | 10 | 4,293 |
|   | 0.05 | 16.7 | 10 | —* |
|   | Closed | 16.7 | 20 | 5,530 |
| 3 | 0.05 | 16.7 | 30 | 44,360 |
|   | 0.05 | 16.7 | 20 | —* |
|   | Closed | 16.7 | 10 | 96,164 |
|   | 0.05 | 16.7 | 10 | —* |
|   | Closed | 16.7 | 20 | 71,348 |

* Flow capacity not run after these intermediate steps.

From the above data it may readily be seen that the highest simulated fracture flow capacity results when acid is forced between open fracture faces for an initial period of time to form channels therein and then forced through the channels with the fracture faces closed for an additional period of time so that the channels are enlarged.

What is claimed is:

1. A method for creating high capacity flow channels in a well formation without the use of propping agents which comprises the steps of:
   a. inducing fractures in said formation;
   b. contacting the faces of said fractures with acid while maintaining said fractures in an open position to thereby etch channels in said faces;
   c. allowing said fractures to close; and
   d. flowing acid through said channels while said fractures are closed to thereby enlarge said channels whereby said high capacity flow channels are formed in said formation.

2. A method for creating high capacity flow channels in a well formation without the use of propping agents which comprises the steps of:
   a. injecting acid into said formation at a pressure sufficient to create and open fractures therein;
   b. allowing said acid to etch the faces of said open fractures to thereby form channels in said faces;
   c. reducing said pressure on said formation so that said fractures are closed;
   d. injecting additional acid into said formation at a pressure less than said fracture pressure utilized in step (a) such that said fractures remain closed whereby said additional acid flows through and enlarges said channels to thereby form said high capacity flow channels in said formation.

3. The method of claim 2 wherein said acid is selected from the group consisting of aqueous solutions of hydrochloric acid, acetic acid, formic acid, hydrofluoric acid and mixtures thereof.

4. The method of claim 3 wherein said acid utilized in steps (a) and (b) is retarded acid and the additional acid utilized in step (d) is unretarded acid.

5. The method of claim 3 wherein said acid in step (d) is injected into said formation at a relatively low initial rate and progressively increased to a relatively high rate.

6. The method of claim 5 wherein said additional acid is unretarded at said relatively low rate and retarded at said relatively high rate.

7. A method for creating high capacity flow channels in a well formation without the use of propping agents comprising the steps of:
   a. pumping a fracturing fluid into said formation at a pressure sufficient to create fractures in said formation extending outwardly from said well bore;
   b. pumping acid into said formation at a pressure equal to or greater than the fracturing pressure of step (a) whereby said fractures are held open and the faces thereof are etched by said acid to thereby form channels in said faces;
   c. reducing the pressure on said formation so that said fractures are closed; and
   d. pumping additional acid into said formation at a pressure sufficient to cause said additional acid to flow through and enlarge said channels formed in said faces of said fractures, but insufficient to open said fractures thereby forming said high capacity flow channels in said formation.

8. The method of claim 7 wherein said fracturing fluid is selected from the group consisting of water, gelled water, hydrocarbon-in-water emulsions, water-in-hydrocarbon emulsions, gelled hydrocarbons, and high viscosity hydrocarbon liquids.

9. The method of claim 8 wherein said acid is selected from the group consisting of aqueous solutions of hydrochloric acid, acetic acid, formic acid, hydrofluoric acid and mixtures thereof.

10. The method of claim 9 wherein said acid utilized in step (b) is retarded acid and the additional acid utilized in step (d) is unretarded acid.

11. The method of claim 9 wherein said additional acid of step (d) is pumped into said formation at a relatively low initial rate and progressively increased to a relatively high rate.

12. The method of claim 11 wherein said additional acid utilized in step (d) is unretarded acid at said relatively low rate and retarded acid at said relatively high rate.

* * * * *

UNITED STATES PATENT OFFICE
CERTIFICATE OF CORRECTION

Patent No. 3,768,564          Dated October 30, 1973

Inventor(s) John A. Knox and Sherman E. Fredrickson

It is certified that error appears in the above-identified patent and that said Letters Patent are hereby corrected as shown below:

In Column 3, line 29: Insert the words --walnut hulls-- between the words "glass beads," and "metal shot".

In Column 5, lines 6 and 7: Delete the word "linestone" and insert therefor the word --limestone--.

Signed and sealed this 9th day of April 1974.

(SEAL)
Attest:

EDWARD M. FLETCHER, JR.　　　　　　C. MARSHALL DANN
Attesting Officer　　　　　　　　　　Commissioner of Patents